(12) United States Patent
Holmes

(10) Patent No.: US 10,310,559 B2
(45) Date of Patent: Jun. 4, 2019

(54) VARIABLY DEPLOYABLE CASCADING PIVOTAL VISOR FOR A MOBILE DEVICE

(71) Applicant: Ina Holmes, Deer Park, NY (US)

(72) Inventor: Ina Holmes, Deer Park, NY (US)

( * ) Notice: Subject to any disclaimer, the term of this patent is extended or adjusted under 35 U.S.C. 154(b) by 436 days.

(21) Appl. No.: 15/002,503

(22) Filed: Jan. 21, 2016

(65) Prior Publication Data

US 2016/0227663 A1 Aug. 4, 2016

Related U.S. Application Data

(60) Provisional application No. 62/105,954, filed on Jan. 21, 2015.

(51) Int. Cl.
| | |
|---|---|
| *G06F 1/16* | (2006.01) |
| *A45C 11/00* | (2006.01) |
| *H04M 1/02* | (2006.01) |
| *A45C 13/16* | (2006.01) |
| *A45B 23/00* | (2006.01) |

(52) U.S. Cl.
CPC ............ *G06F 1/1633* (2013.01); *A45C 11/00* (2013.01); *G06F 1/1603* (2013.01); *G06F 1/1626* (2013.01); *G06F 1/1637* (2013.01); *H04M 1/026* (2013.01); *A45B 2023/0093* (2013.01); *A45C 13/16* (2013.01); *A45C 2011/002* (2013.01); *A45C 2011/003* (2013.01); *A45F 2200/0516* (2013.01); *H04M 1/0214* (2013.01)

(58) Field of Classification Search
CPC ..................... G06F 1/16–1/1698; F21V 1/06; H04M 1/026
See application file for complete search history.

(56) References Cited

U.S. PATENT DOCUMENTS

| | | | |
|---|---|---|---|
| 5,508,757 | A | 4/1996 | Chen |
| 5,717,566 | A | 2/1998 | Tao |
| 5,818,635 | A | 10/1998 | Hohn |
| 5,877,896 | A | 3/1999 | Gremban |
| 5,905,546 | A | 5/1999 | Giulie |

(Continued)

FOREIGN PATENT DOCUMENTS

WO WO 2012/045563 12/2012

*Primary Examiner* — William R Alexander
*Assistant Examiner* — Jeffrey E Madonna
(74) *Attorney, Agent, or Firm* — Thomas A. O'Rourke; Bodner & O'Rourke, LLP

(57) ABSTRACT

A visor assembly may clip onto a mobile electronic device, and may broadly include: an attachment member securable to the device; at least one hinge secured to the attachment member; and a plurality of cascading shroud members, each pivotally coupled to the attachment member using the hinge. Adjacent shroud members are selectively interconnected. Rotational movement of a first shroud member from a retracted position to a first angular displacement, correspondingly drives a second shroud member to rotate in unison. Continued rotation of the first shroud member successively drives remaining shroud members to co-rotate, until it has been rotated to a second angular displacement, and the plurality of shroud members are each then deployed into a respective fully extended position. A friction fit at the interconnection between adjacent shroud members is sufficient to releasably inhibit movement resulting from only a weight of the shroud members and the orientation of the device.

19 Claims, 25 Drawing Sheets

(56) References Cited

U.S. PATENT DOCUMENTS

| | | | |
|---|---|---|---|
| 6,419,367 B1 | 7/2002 | Dion | |
| 6,892,880 B2 | 5/2005 | Nieves | |
| 7,303,077 B2 | 12/2007 | Harlocker | |
| 7,508,657 B1 | 3/2009 | Smith | |
| 7,553,034 B1 | 6/2009 | Liou | |
| 8,075,145 B2 | 12/2011 | Engblom | |
| 8,371,704 B1 | 2/2013 | Lin | |
| 8,727,546 B2 | 5/2014 | Trinh | |
| 8,777,002 B2 | 7/2014 | Lonsdale | |
| 9,806,756 B1 * | 10/2017 | Jacobs | H04M 1/185 |
| 2002/0020707 A1 * | 2/2002 | Hardy | A47F 3/004 |
| | | | 220/252 |
| 2003/0089832 A1 * | 5/2003 | Gold | A45F 5/02 |
| | | | 248/454 |
| 2009/0219621 A1 | 9/2009 | Perkins | |
| 2010/0294683 A1 | 11/2010 | Mish | |
| 2013/0341233 A1 | 12/2013 | Dow | |
| 2014/0349719 A1 | 11/2014 | Chun | |
| 2014/0375901 A1 * | 12/2014 | Stockett | H04N 5/64 |
| | | | 348/838 |
| 2015/0124328 A1 * | 5/2015 | Dorros | G06F 1/1603 |
| | | | 359/609 |
| 2015/0381785 A1 * | 12/2015 | Gander | A45F 5/00 |
| | | | 455/575.1 |
| 2016/0032644 A1 * | 2/2016 | Geller | E06B 9/24 |
| | | | 160/134 |
| 2017/0294935 A1 * | 10/2017 | Jacobs | H04M 1/185 |
| 2017/0322590 A1 * | 11/2017 | Jacobs | H04B 1/3888 |

\* cited by examiner

VARIABLY DEPLOYABLE CASCADING PIVOTAL VISOR FOR A MOBILE DEVICE

CROSS REFERENCES TO RELATED APPLICATIONS

This application claims priority on U.S. Provisional Application Ser. No. 62/105,954, filed on Jan. 21, 2015, the disclosures of which are incorporated herein by reference.

FIELD OF THE INVENTION

The present invention relates to the field of accessories that may be used on a portable electronic device, including a cell phone and/or a tablet, and more particularly to accessories that may be used as a privacy shield and/or a glare shield.

BACKGROUND OF THE INVENTION

The tendency for today's portable electronic devices is towards enhanced capability in a small to mid-size housing. Cell phones are largely sized to fit within the pockets of a person's slacks or a purse, and even laptop computers are increasingly being replaced with the use of tablets that are smaller, sleeker, and more easily transported.

The smaller these electronic devices become, with the intent of providing greater mobility for its user, the less adequate are many of the prior art privacy/sun screens and visors. Some of these prior art devices include the following.

U.S. Pat. No. 5,508,757 to Chen is for a "Foldable Screen Protector" intended for use on a computer monitor or a notebook computer, and may include a foldable top cover, and foldable left and right support plates.

U.S. Pat. No. 5,905,546 to Giulie is for a "Detachable Visor for Lap-Top Computer Monitor," which has a central panel and two side panels.

U.S. Pat. No. 7,508,657 to Smith describes a "Privacy-Enhancing, Glare-Reducing Display Screen Shield." The shield taught by Smith may be formed of a pleated central portion, and first and second legs on each, of the two edges of the pleated central portion, with at least one of the legs being used to attach the shield to the electronic device.

U.S. Pat. No. 7,553,034 to Liou is for a "Display Having a Visor," Lion teaches the use of two sliding members, two spinning arms, and a visor, where one end of each of the spinning arms is pivotally coupled to the sliding member, and the spinning arms support the visor. The flat visor may be positioned to block sunlight, or it may be pivoted to the front of the display screen to protect it from dust and scratches.

U.S. Pat. No. 7,871,170 to Perkins is for a "Protective Visor for Marine Electronics." The Perkins visor includes a visor body with turned-out protruding portions that define first and second water flow paths.

U.S. Pat. No. 8,075,145 to Engblom describes "Display Screen Shades for Mobile Devices." Engblom teaches a bracket for attachment to a mobile device, and a light valve that is pivotally coupled to the hinge, to permit pivotal movements of the light valve between at least two positions.

U.S. Patent Application Pub. No. 2013/0341233 by Dow is for a "Tablet Case with Glare Protection." The tablet case taught by Dow includes a cover pivotally connect to a base, and a pair of side panels that can be folded against the cover in a closed position.

U.S. Pat. No. 8,727,546 to Trinh is for a "GPS Visor." The visor taught by Trinh includes a flat shield member that is snapped onto a GPS unit, to improve viewing of the display screen when the unit is utilized in proximity to a vehicle's windshield.

WIPO Publication No. WO 2012/045563 by Scanlan is to an "Anti-Glare Visor for Portable Visual Display Unit." The Scanlan visor includes side walls, an end wall, and a top wall where the end wall and top wall are integrally formed.

The Applicant herein, teaches a variably deployable cascading pivotal visor for a mobile device—an arrangement that offers numerous advantageous over the prior art devices.

OBJECTS OF THE INVENTION

It is an object of the invention to provide a visor for a cell phone, tablet, laptop computer, and/or other mobile electronic devices, to shield the display screen and prevent glare thereon that results from bright ambient lighting or from sunlight.

It is another object of the invention to provide a visor that may serve as a privacy shield for such mobile electronic devices, to prevent unauthorized viewing of the display screen by other people.

If is a further object of the invention to provide a visor for glare prevention and/or privacy that may be secured to a mobile electronic device.

It is another object of the invention to provide a protective case for a mobile electronic that may include a visor.

It is also an object of the invention to provide a visor for glare prevention and/or privacy that may be releasably clip onto a case that is already secured to a mobile electronic device.

It is another object of the invention, to provide a visor for a mobile electronic device that may include a plurality of cascading visor elements, which may individually extend to advantageously provide for glare prevention and/or privacy, and which, may retract into a compact envelope.

It is also an object of the invention to provide a visor with a plurality of visor elements which may permit the visor to be variably deployed to a desired position, depending upon the angularity of the light source with respect to the screen, as held by the user of the mobile electronic device.

Further objects and advantages of the invention will become apparent from the following description and claims, and from the accompanying drawings.

SUMMARY OF THE INVENTION

This Summary is provided to introduce a selection of concepts in a simplified form that are further described below in the Detailed Description. This Summary is not intended to identify key features or essential, features of the claimed subject matter, nor is it intended to be used, to limit the scope of the claimed subject matter.

A visor assembly for a mobile electronic device may broadly include: an attachment member configured to be secured to the mobile electronic device; at least one hinge secured to the attachment member; and a plurality of cascading shroud members. The shroud members may each be pivotally coupled to the attachment member using the hinge, and may be configured to interconnect with an adjacent shroud member. This interconnection may be configured for rotational movement of a first shroud member from a retracted position to at least a first angular displacement, to correspondingly drive at least a second shroud member to thereafter rotate in unison. The continued rotational movement of the first shroud member to a second angular displacement may be configured to sequentially drive each other shroud member of the plurality of shroud members to deploy into a respective folly extended position. The interconnection between the adjacent the shroud members may be an outwardly disposed Up on a rear portion of each of the shroud members being configured to engage with an inwardly disposed lip on a front portion of the adjacent shroud member, after a selective amount of rotation has occurred. The interconnection between the adjacent shroud members may also be formed with a friction fit therebetween, being sufficient to releasably inhibit movement resulting from only a weight of the shroud members and the orientation of the mobile device.

Each of the plurality of shroud members may U-shaped, having a top shroud portion and two side shroud portions, where each of the side shroud portions for each shroud member is pivotally coupled to the attachment member using the hinge. The top shroud portion for each of the plurality of shroud members may be at a successively increased distance from the hinge, and the side portions for each successive shroud member may also be at an increased distance apart. Thus, the plurality of shroud members may form a nested arrangement, being nested according to incremental size difference.

The sequential deployment of the plurality of shroud members may be according size, beginning with the smallest shroud member and ending with the largest shroud member, or vice versa.

The attachment member may be configured to engage the mobile device in one of several different ways. The attachment member may be configured to engage a back surface and four side surfaces of the mobile electronic device. Alternatively, the attachment member may be configured to engage at least a portion of the back surface, and at least a portion of four side surfaces of the mobile electronic device. In another arrangement, the attachment member may be configured to engage at least a portion of the back surface and three side surfaces of the mobile electronic device. In yet another arrangement, the attachment member may be configured to engage a portion of the back surface and a portion of two side surfaces of the mobile electronic device.

The visor assembly may contain any desired number of shroud members. The visor assembly may be configured so that movement of the plurality of shroud members into the respective fully extended, positions may require an angular displacement of 90 degrees for the first shroud member. Other angular displacements to reach the respective fully extended position for each of the plurality of shroud members may alternatively be used.

BRIEF DESCRIPTION OF THE DRAWINGS

The description of the various example embodiments is explained in conjunction with appended drawings, in which.

DETAILED DESCRIPTION OF THE INVENTION

As used throughout this specification, the word "may" is used in a permissive sense (i.e., meaning having the potential to), rather than the mandatory sense (i.e., meaning must). Similarly, the words "include", "including", and "includes" mean including but not limited to.

The phrases "at least one," "one or more," and "and/or" are open-ended expressions that are both conjunctive and disjunctive in operation. For example, each of the expressions "at least one of A, B and C," "one or more of A, B, and C," and "A, B, and/or C" means all of the following possible combinations: A alone; or B alone; or C alone; or A and B together; or A and C together; or B and G together; or A, B and C together.

Also, all reference documents (e.g., patents, patent publications, and non-patent literature) that are cited within this documents are incorporated herein in their entirety by reference.

Furthermore, the described features, advantages, and characteristics of any particular embodiment disclosed in the following specification, may be combined in any suitable manner with any of the other embodiments disclosed herein.

Figure 6:
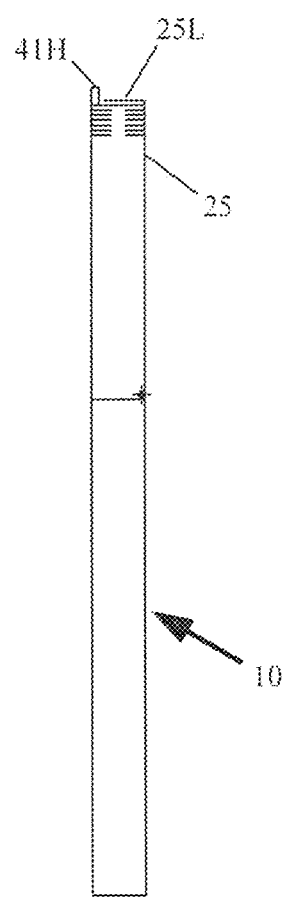
FIG. 6 is a side view of the visor assembly of FIG. 1, with the shroud members shown in the fully retracted position.
Figure 7:
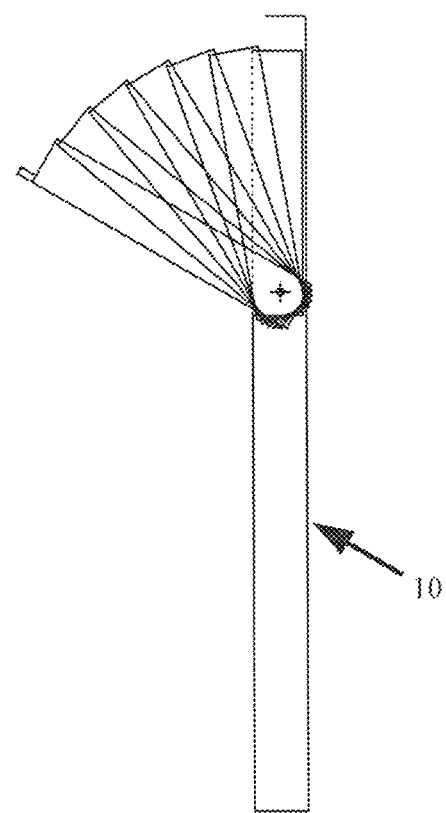
FIG. 7 is the side view of FIG. 6D, but with both the outermost shroud member having been rotated sufficiently to drive each of the other shroud members into a respective fully extended position.
Figure 8:
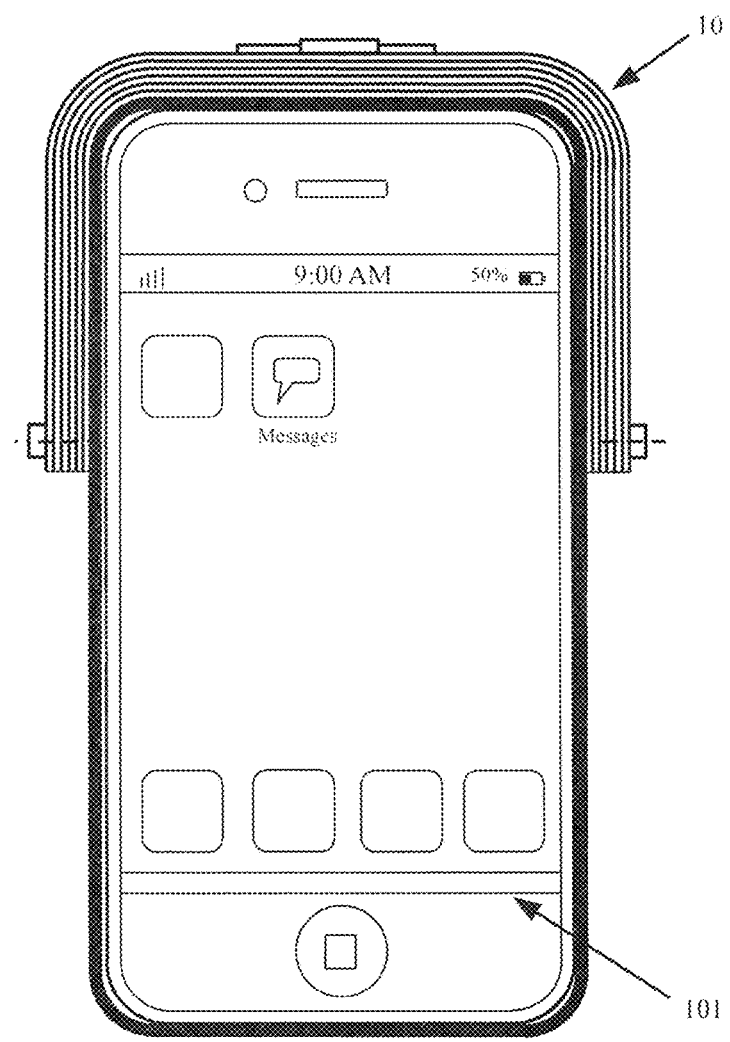
FIG. 8 illustrates the visor assembly of FIG. 1, with a cell phone received in its case portion.
Figure 9:
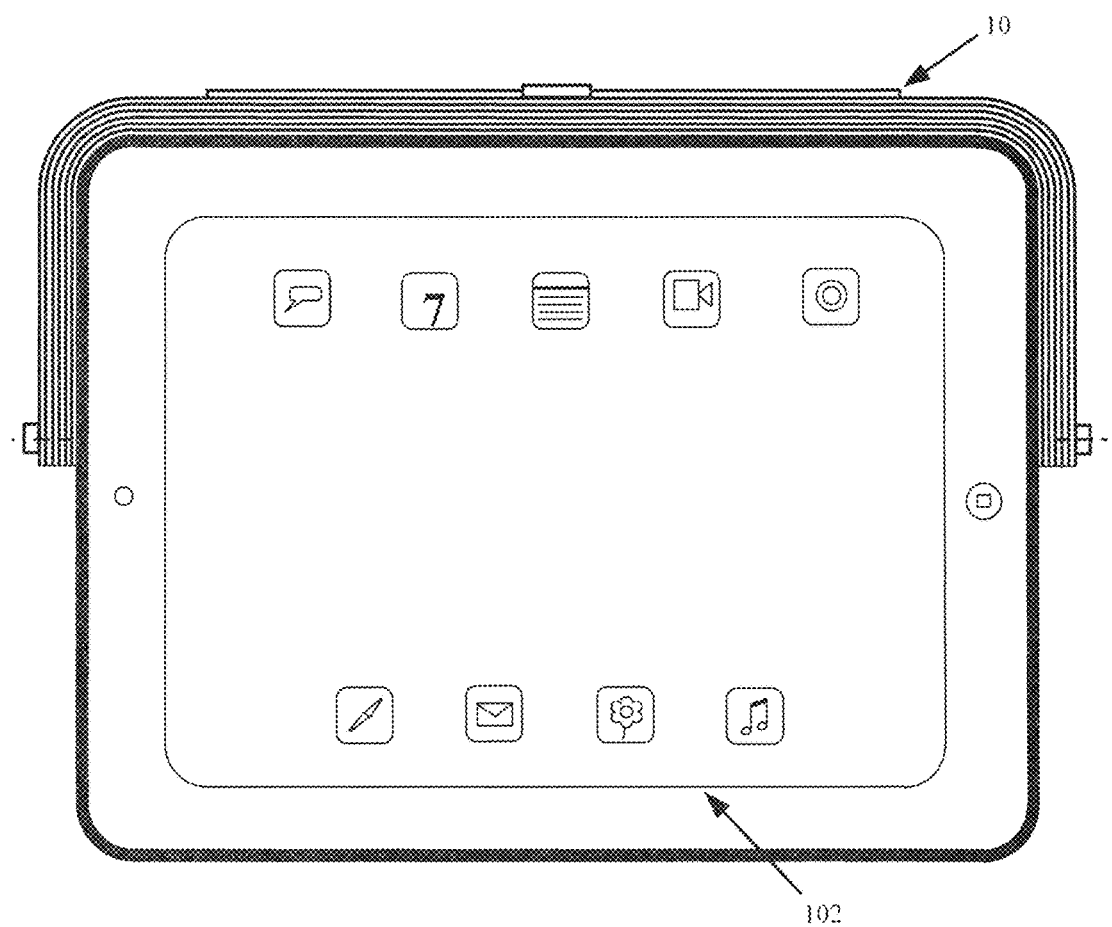
FIG. 9 illustrates a larger version of the visor assembly of FIG. 1, with a tablet received therein.
Figure 10:
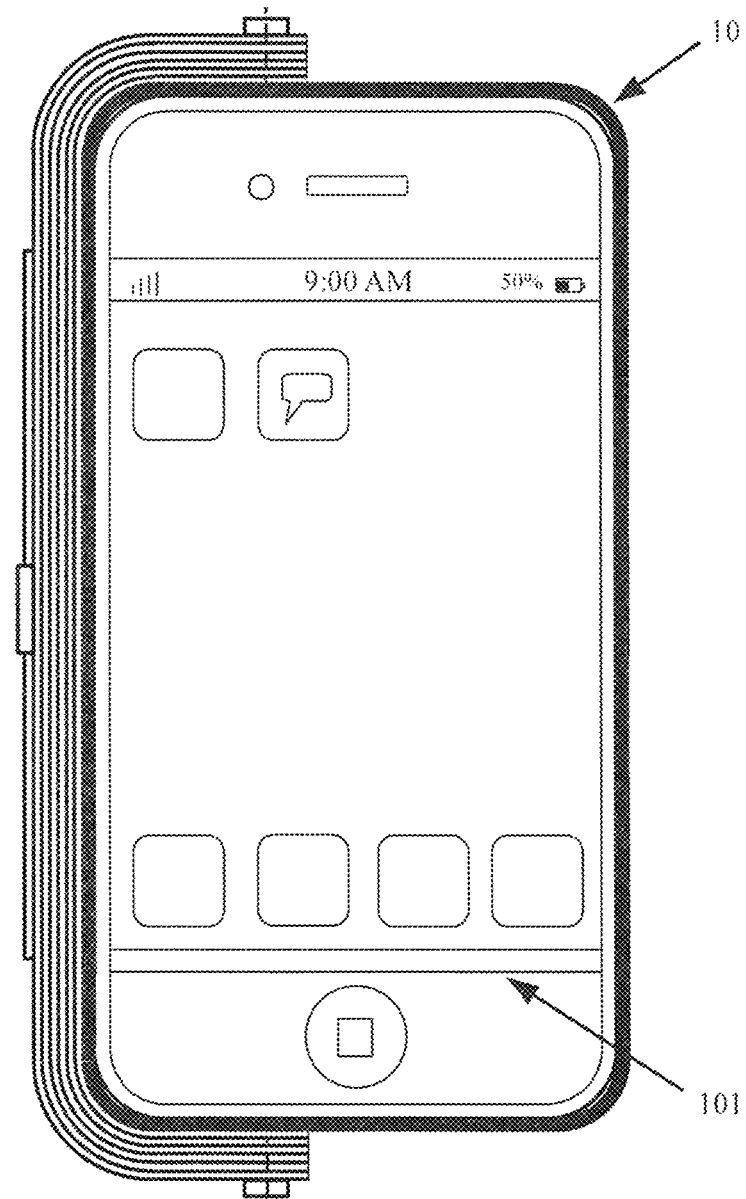
FIG. 10 illustrates the visor assembly embodiment of FIG. 1, being sized to receive a cell phone therein, with the visor oriented along a length-wise side of the mobile device.
Figure 11:
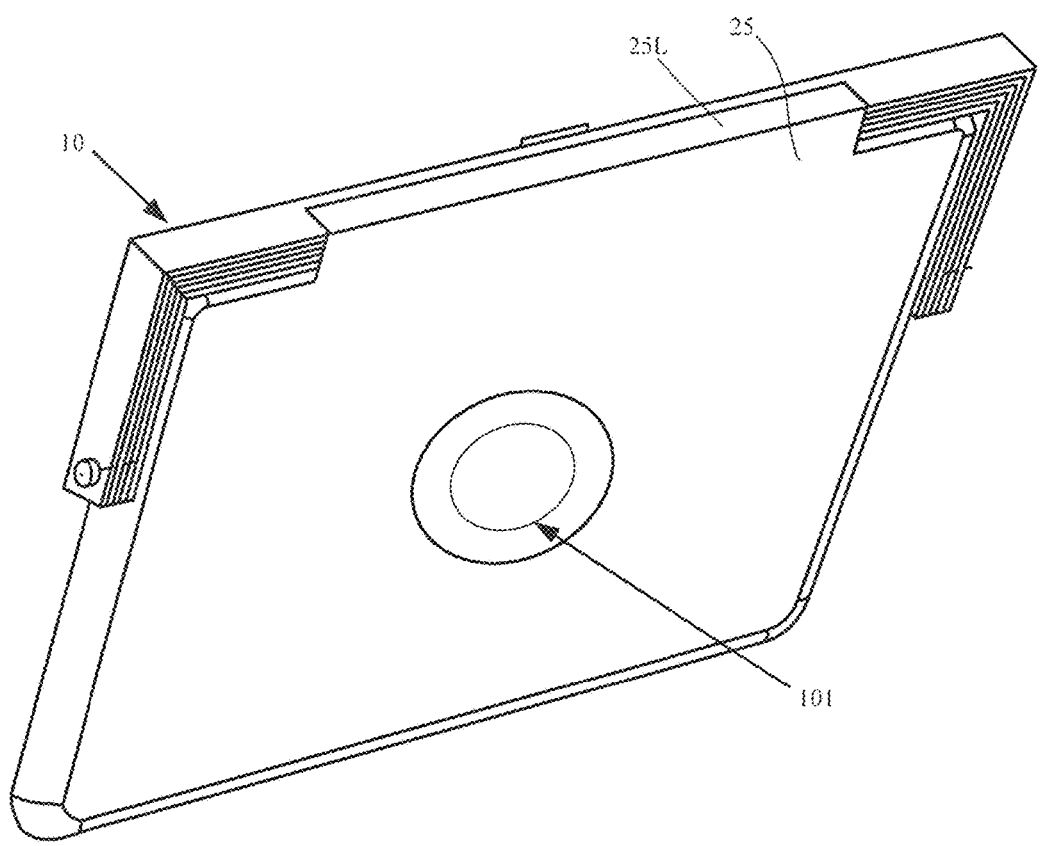
FIG. 11 is a rear perspective view of the visor assembly shown in FIG. 9, with a tablet received therein, and with the visor shown in the fully retracted position.

FIGS. 1 through 7 illustrate a first embodiment of the variably deployable pivotal visor assembly of the present invention. The visor assembly 10 may broadly include an attachment member 20, a hinge 30, and a plurality of individual cascading shroud members (e.g., 41, 42, 43, 44, 45, 46, etc.). Note that although six shroud members are shown for the visor assembly 10 in FIG. 1, a greater number or a lesser number of shroud members may alternatively be utilized, as discussed hereinafter. The visor assembly 10 is shown in FIG. 8 being used for a cell phone 101, and also in FIG. 9, but having different proportion to be used for a tablet 102, and also in FIG. 10 to again be used for a cell phone, but to be oriented along the length-wise direction of the electronic device.

The attachment member 20 may take on one of several different forms. For the visor assembly 10 in FIG. 1, the attachment member 20 may be configured to engage a back surface and four side surfaces of the mobile electronic device, and thus may resemble, and may also be utilized as, a protective case for the device. Alternatively, the attachment member 20 may be oversized so that it may be mounted over a protective case that is already secured onto the mobile device.

Figure 1:
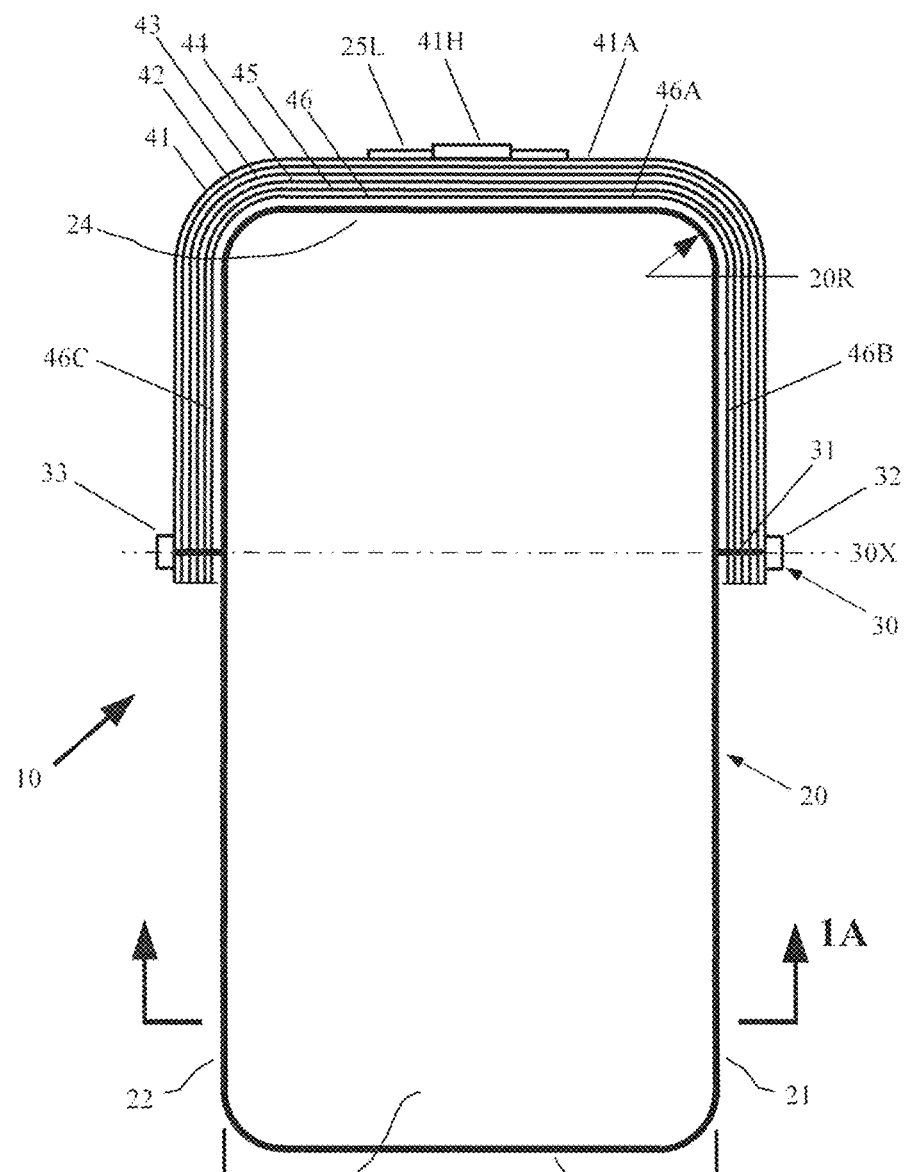
FIG. 1 illustrates a front view of a first embodiment of the herein disclosed variably deployable cascading pivotal visor assembly, which may use a plurality of individual cascading shroud members, and where an attachment member may be configured as a protective case that may engage a back surface and four side surfaces of the mobile electronic device.
Figure 1A:
FIG. 1A is a cross-sectional view through the case-portion of the visor assembly of FIG. 1.
Figure 2:
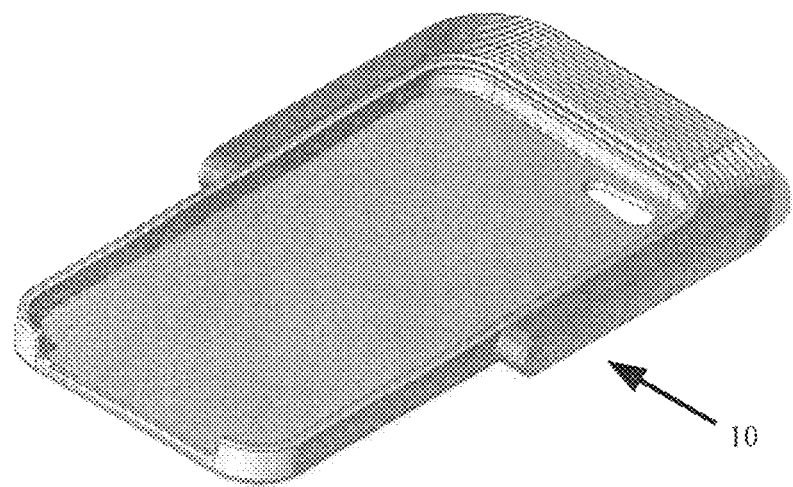
FIG. 2 illustrates a perspective view of the case and visor assembly of FIG. 1, with the visor assembly shown in the fully retracted position.
Figure 3:
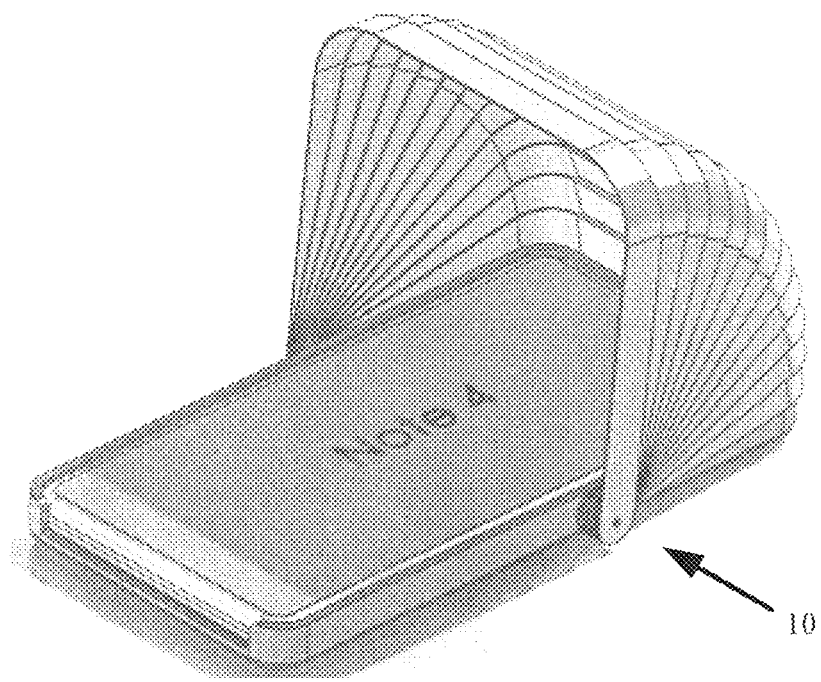
FIG. 3 is the perspective view of FIG. 2, but with the visor assembly shown in an extended position.
Figure 4:
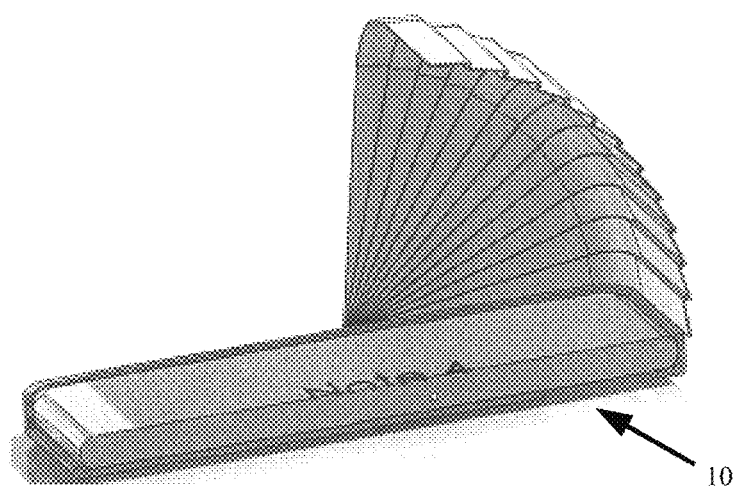
FIG. 4 is a perspective cross-sectional view through the visor assembly of FIG. 3.
Figure 5:
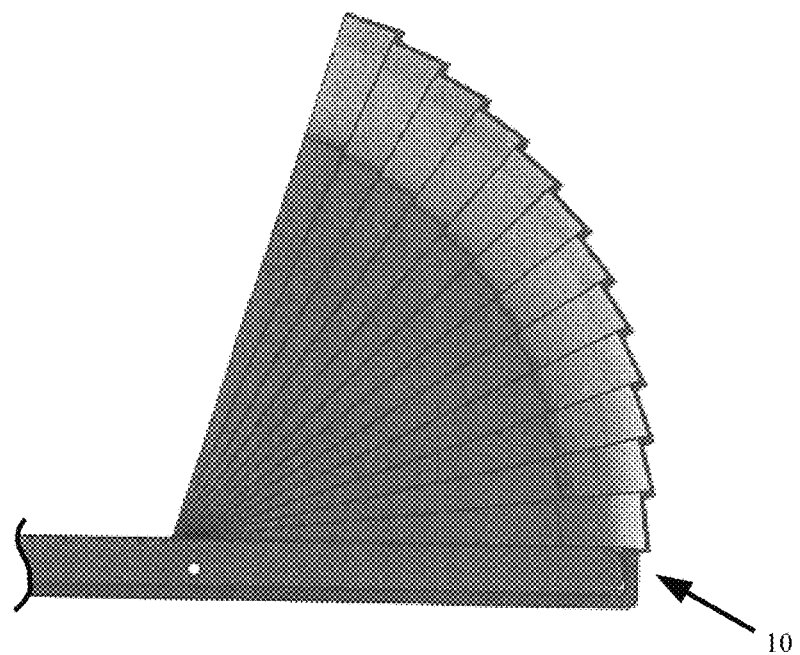
FIG. 5 a side cross-section view through the visor assembly of FIG. 3.

The side surfaces of many of today's mobile electronic devices (e.g., cell phones, tablets, etc.) do not have straight sides with sharp corners at the interface with the top and bottom surfaces, which could cause discomfort when earned in the user's pants pocket. Instead, these devices usually now have curved side surfaces. Therefore, the side walls of the attachment member 20 may be flat or curved. The attachment member 20, as shown in FIGS. 1 and 1A, may have a substantially flat rear wall 25, and four curved side walls (21, 22, 23, and 24) that may extend from the rear wall. The curvature of the interior of the side walls (21, 22, 23, and 24) may be formed to match and suitably engage the four side surfaces of the particular mobile electronic device that is to be received therein. The attachment member 20 may be formed of a rigid or semi-rigid plastic material, or a metallic material, or may instead be formed of a flexible material that may be a rubber material, or it may be formed of a mix of rubber and plastic, or a other suitable material(s).

Figure 13:
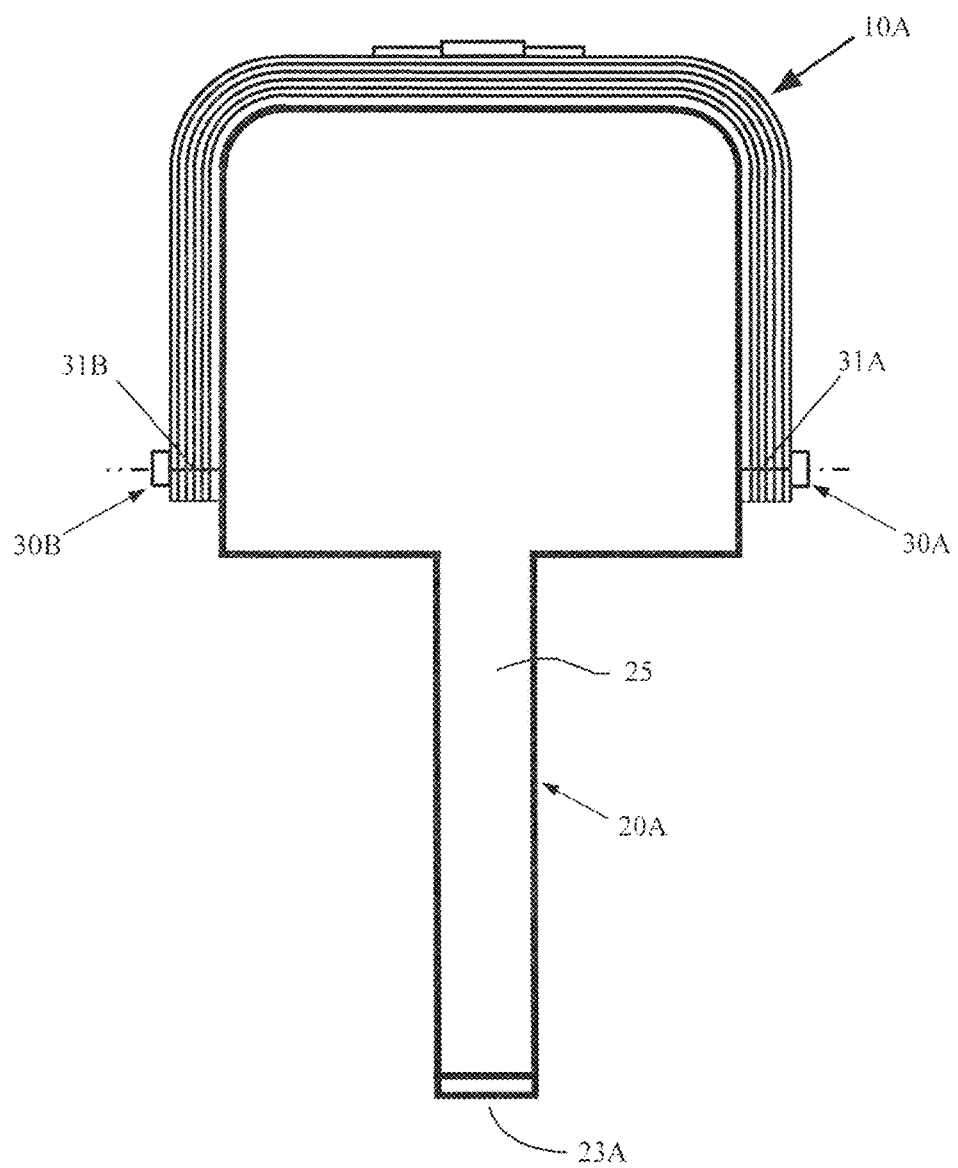
FIG. 13 illustrates an alternate embodiment of the visor assembly of FIG. 1, which may include mounting features that permit it to snap onto at least a portion of four sides and a portion of the back of the mobile electronic device.

Coupled to the attachment member 29 may be at least one hinge 30. The hinge 30 may include a single hinge pin 31 that may traverse from a first side 26 of the attachment member 20 to a second side 27, in proximity to the back wall 25 (see FIG. 6). Alternatively, two separate hinges may be utilized (e.g., 30A/30B) with separate hinge pins (31A/31B), as seen in FIG. 13, the location for which may also be more generally centered on the side-walls 21/22 (see FIG. 7). A head 32/33 may be formed on each end of the pin 31 for the hinge 30 to positively maintain each of the shroud members (e.g., 41, 42, 43, 44, 45, 46, etc.) pivotally mounted with respect to the attachment member 20. Note that in addition to the above-described hinge, any other suitable hinge arrangement may be used, including a binge rivet (see e.g., U.S. Pat. No. 3,505,923 to Neill), or a friction hinge (see e.g., U.S. Pat. Nos. 3,040,339 and 3,239,874 each to Sperzel; U.S. Pat. No. 4,490,884 to Vickers; and U.S. Pat. No. 7,520,027 to Lu).

Each of the plurality of shroud members (see e.g., shroud member 46 in FIG. 1) may be formed with a top shroud portion (e.g., 46A), and two side shroud portions (e.g., 46B and 46C). The two side shroud portions of each of the plurality of shroud member may be pivotally mounted to the hinge 30. The top shroud portion 46A and side shroud portions 46B and 46C of the innermost shroud member 46 may have a radiused transition therebetween, which may be configured to match the radius 20R of the attachment member 20, which itself may correspond to the corner radius of the mobile device. The top shroud portion 46A and side shroud portions 46B and 46C may be in contact with, or may be suitably spaced apart from, the periphery of the attachment member 20.

Thus, the shroud members may each, be generally U-shaped. Each successively larger shroud members utilized thereafter (e.g., shroud members 41-45) may also have suitable spacing therebetween, which may depend upon the interconnection formed between adjacent shroud members, as discussed, hereinafter. Therefore, each successive shroud member may be characterized with an increase in size, both in the short transverse direction (i.e., the axial direction of the hinge 30X), and in the long trans verse direction. As such, the plurality of shroud members may form a nested arrangement (see FIG. 2). The outermost shroud member 41 may have a small finger actuable handle member 41H.

Figure 6A:
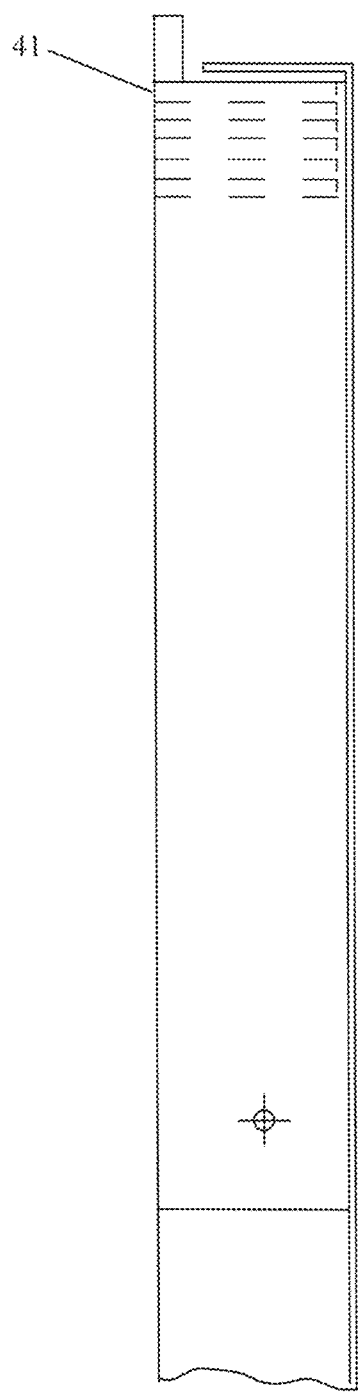
FIG. 6A is an enlarged detail view of the visor assembly of FIG. 6.

The plurality of shroud members (e.g., 41, 42, 43, 44, 45, 46, etc.) may each initially occupy a retracted position, as seen in FIG. 1 and FIGS. 6-6A, in which each shroud member may be in contact with a portion of the back wall 25 of the attachment member 20, which may have a return flange 25L formed thereon. (Note that respective magnets on the shroud members and back wall 25, or corresponding magnetic materials, may be used to retain each of the shroud members in the retracted position until positively actuated by a user). The plurality of shroud members (e.g., 41, 42, 43, 44, 45, 46, etc.) may each be configured to selectively interconnect with at least one adjacent shroud member, so that the pivotal motion of a first shroud member (e.g., the outermost shroud member 41), in moving from the retracted position of FIG. 6A to a first angular displacement shown in FIG. 6B, may thereafter serve to drive the adjacent shroud member (i.e., shroud member 42) to similarly pivot in unison.

Figure 6B:
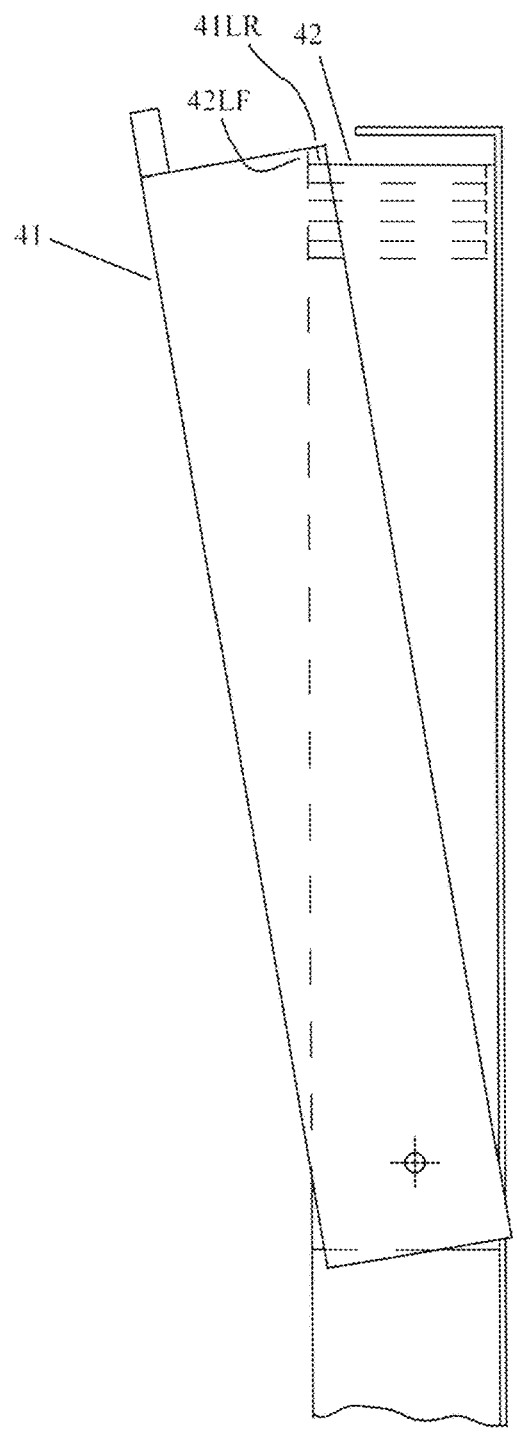
FIG. 6B is the side view of FIG. 6A, but with the outermost shroud member rotated into an angular position at which a portion thereof may engage the adjacent shroud member, so that any further rotation of the outermost shroud member would cause corresponding rotation of the adjacent shroud member.
Figure 6C:
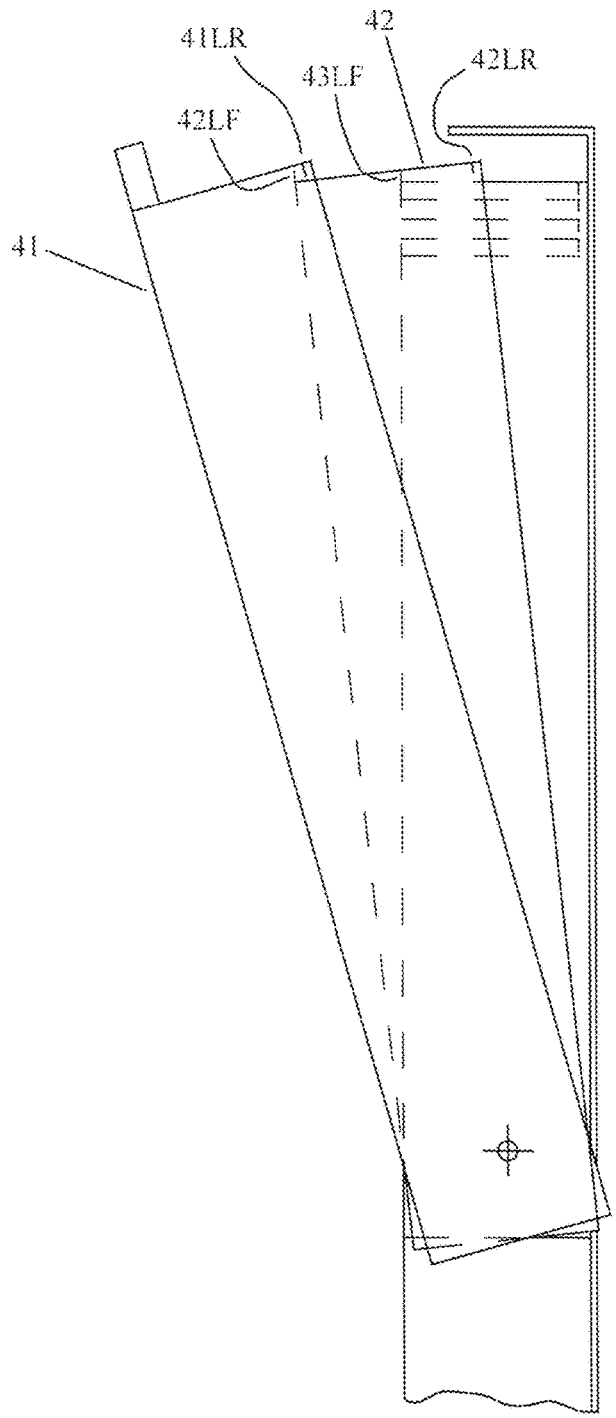
FIG. 6C is the side view of FIG. 6B, but with both the outermost shroud member and the adjacent (second) shroud member both having been rotated.
Figure 6D:
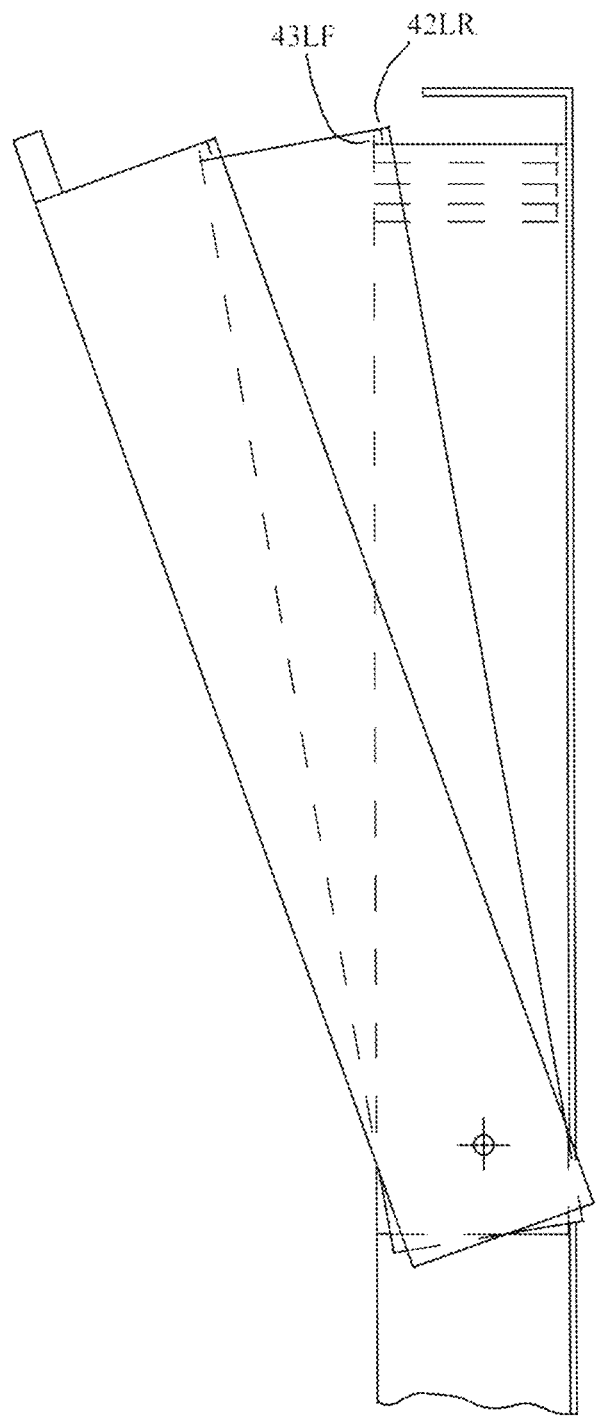
FIG. 6D is the side view of FIG. 6C, but with both the outermost shroud member and the adjacent (second) shroud member both having been rotated until the second shroud member engages the third shroud member.
Figure 7A:
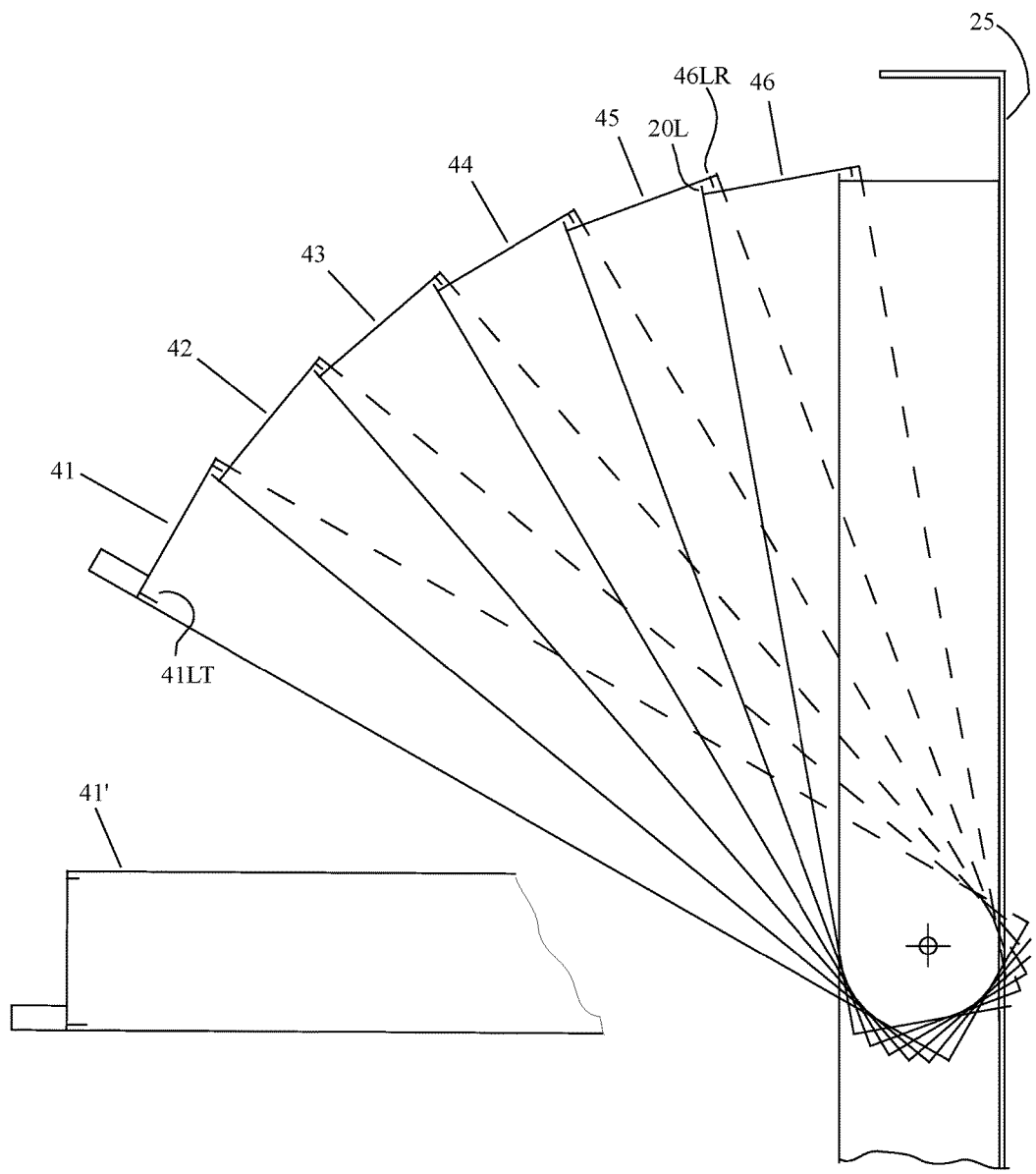
FIG. 7A is the side view of FIG. 7, but also illustrates at least one additional shroud member being utilized so that an outermost shroud member may be at a 90 degree position when in its fully extended position.

As seen in FIG. 6B, an inwardly protruding lip 41LR formed about at least a portion of the periphery of the rear side of the shroud member 41 may engage an outwardly protruding lip 42LF formed about at least a portion of the front of the shroud member 42. Thereafter, continued, pivotal motion imparted to the first shroud member 41, may result in corresponding pivotal movement of the second shroud member 42, due to the contact between lip 41LR and lip 42LF, as seen in FIG. 6C. Once the second, shroud member 42 has been caused to rotate by the first shroud member 41 a similar angular displacement that is shown in FIG. 6D (note that geometric differences may cause this secondary angular displacement to be slightly different), the lip 42LR on the rear side of the second shroud member 42 may contact a lip 43LF on the front side of the third shroud member, and cause it to also rotate in unison with the first and second shroud members. Each of the remaining shroud members (e.g., 44, 45, 46, etc.), however many are utilized, may similarly be driven to rotate, until the last shroud member (e.g., 46) is cause to rotate until a lip 46LR thereon contacts a lip 20L on the attachment member 20, at which time each of the plurality of shroud members has been deployed (rotated) into a respective fully extended position, as seen in FIG. 7. Note that additional shroud members could be utilized so that an outermost shroud member (i.e., 41' as seen, in FIG. 7A) may be at a 90 degree position relative to the back wall 25, when in its fully extended position. The size and number of shroud members may be altered for the assembled arrangement to reach any desired fully extended angular position, other than just 45 degrees or 90 degrees.

The plurality of shroud, members may be caused to counter-rotate (i.e., rotate in the opposite direction) by a force applied by the user to the first shroud member 41, to cause a reverse cascading retracting motion for the shroud members, to move the shroud members from the respective folly extended positions, back to the retracted position of FIG. 6A. Each of the shroud members may have another lip (i.e., lip 41RT on shroud member 41) that may cause counter-rotation of the successively smaller shroud member, absent contact by the users hand/fingers.

It should be noted that this cascading pivotal arrangement is described hereinabove with respect to the interconnections being formed so the outermost shroud member is initially actuated (i.e., the shroud member having a largest distance from the hinge is initially rotated, and the cascading motion ends with the shroud member having a smallest distance to the hinge finally moving into its respective extended position). However, the arrangement may instead be configured so that the inner-most shroud member may be actuated to cause cascading rotational movements of the successively larger shroud members (i.e., the shroud member having the smallest distance to the hinge is initially rotated, and the cascading motion ends with the shroud member having the largest distance to the hinge finally moving into its respective extended position).

It should also be noted that the interconnection between the adjacent shroud members may be formed to provide a slight friction fit therebetween (i.e., lip 42LF for shroud member 42 may minimally contact the top shroud portion 41A of the first shroud member), which friction fit interconnections may be just sufficient to releasably inhibit free movement of each of the shroud members as a result of only the weight of the shroud members and the orientation of the mobile device, when in a deployed position. Thus, a force would need to be positively applied by the user to move the shroud members away from the retracted position when the magnets are used, and a force would also be required to move any one of the shroud members that are in a partially extended or the fully extended position.

Although the visor assembly 10 shown in FIGS. 1-10 is configured for the attachment member 20 to engage the entirety of the back surface and four side surfaces of the mobile electronic device, other arrangements may also be desirable utilized. For example, FIG. 13 illustrates a visor assembly 10A which has an attachment member 20A that is configured to engage a portion of the back surface of the mobile electronic device; one of its side surfaces; and only a portion of three of the other side surfaces of the device. The narrow portion of the back wall 25A of attachment member 20A may be flexibly formed so that the side wall 23A may be able to clip onto the bottom of the device, to releasably secure the visor assembly 10A thereto.

Figure 14:
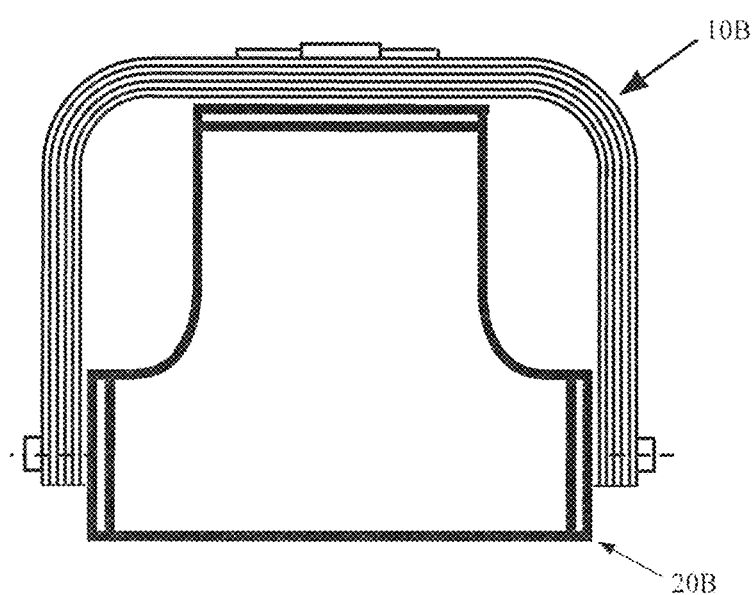
FIG. 14 illustrates another alternate embodiment of the visor assembly of FIG. 1, in which the visor assembly may include mounting features that permit it to snap onto only a portion of three sides and a portion of the back of a mobile electronic device.

FIG. 14 illustrates a visor assembly 10B which has an attachment member 20B that is configured to engage: a portion of the back surface of the mobile electronic device; and only a portion of three side surfaces of the device. For this arrangement, the side walls of the attachment member 20B may be positioned to be clear of any side surface locations of the mobile device where buttons may be positioned, which otherwise may necessitate forming openings in the side wall of the attachment member to provide access thereto.

Figure 15:
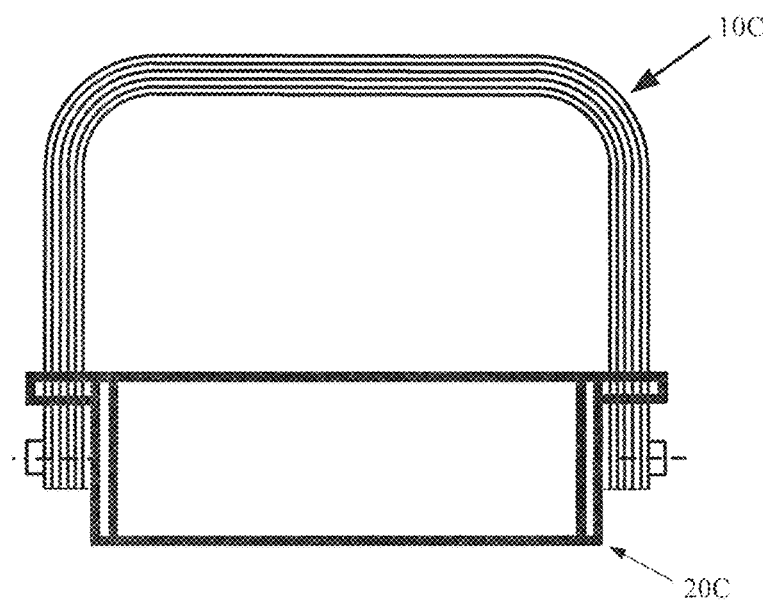
FIG. 15 illustrates a top view of another alternate embodiment of the visor assembly of FIG. 1, in which the visor assembly may include mounting features that permit it to snap onto only a portion of two sides and a portion of the back of a mobile electronic device.
Figure 15A:
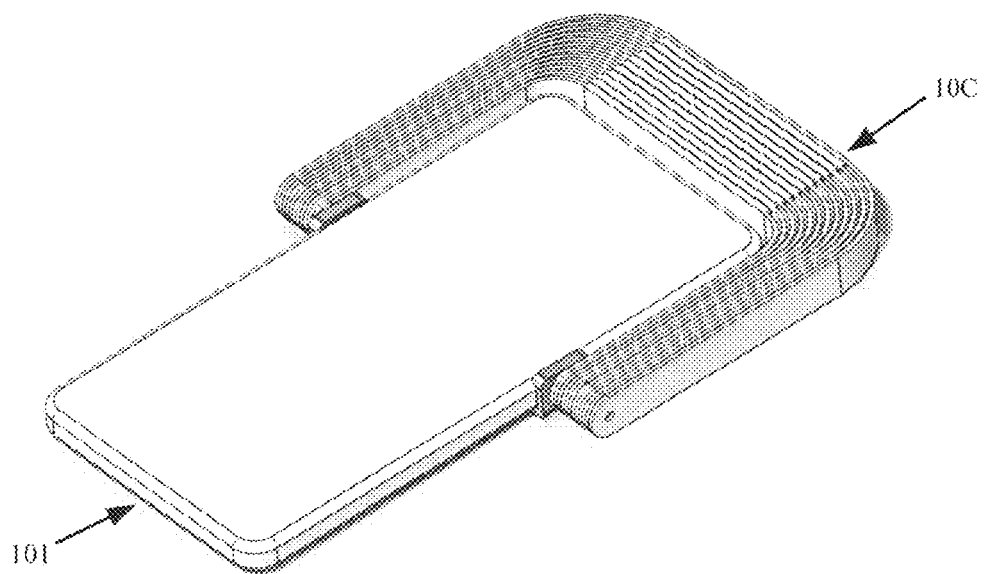
FIG. 15A is a perspective view of the visor assembly of FIG. 15, shown with each of the shroud members in the retracted position.
Figure 15B:
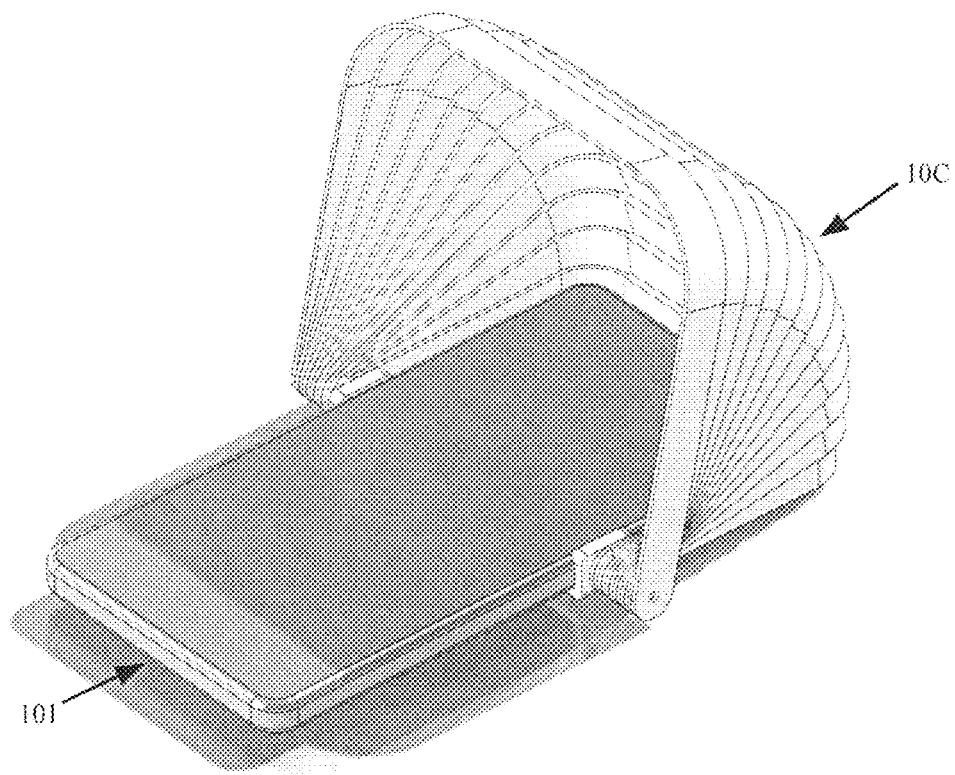
FIG. 15B is the perspective view of FIG. 15A, but shown with each of the shroud members in the respective fully extended positions.
Figure 15C:
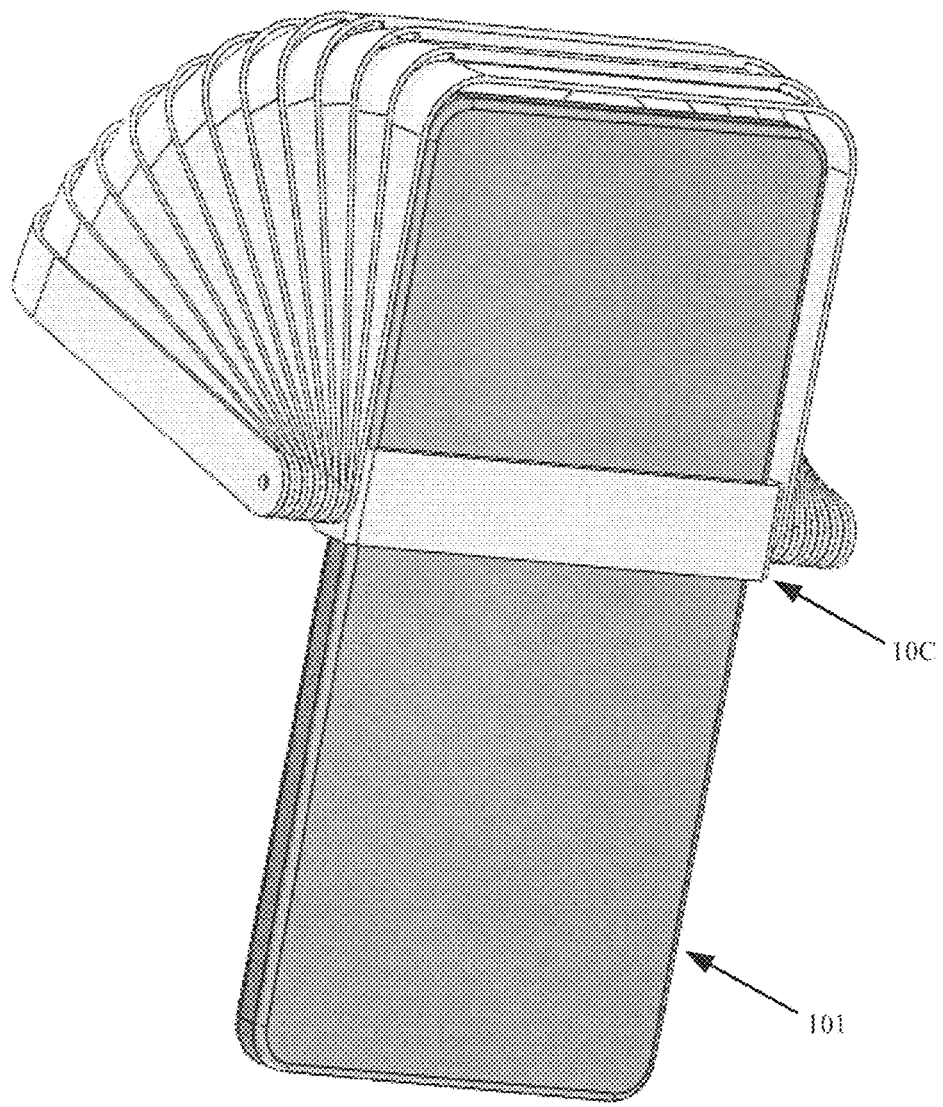
FIG. 15C a reverse perspective view showing the rear of the visor assembly of FIG. 15A, with each of the shroud members in the respective fully extended positions.

FIG. 15 illustrates a visor assembly 10C which has an attachment member 20C that may be configured to engage: a portion of the back surface of the mobile electronic device; and only a portion of two of the side surfaces of the device.

Figure 8A:
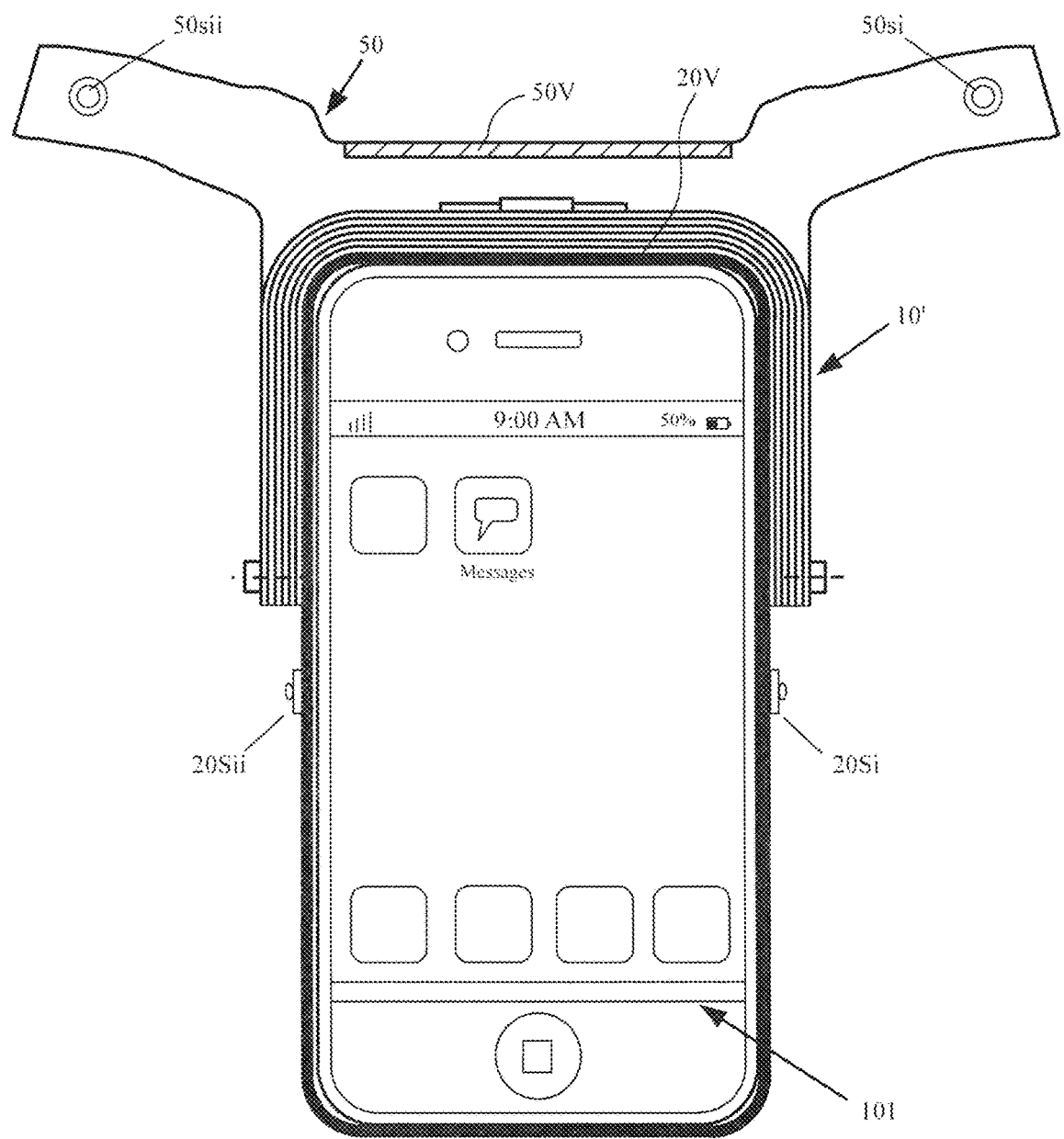
FIG. 8A illustrates the visor assembly of FIG. 1 that also includes a flexible cover member with snaps, which is shown in the detached position.
Figure 8B:
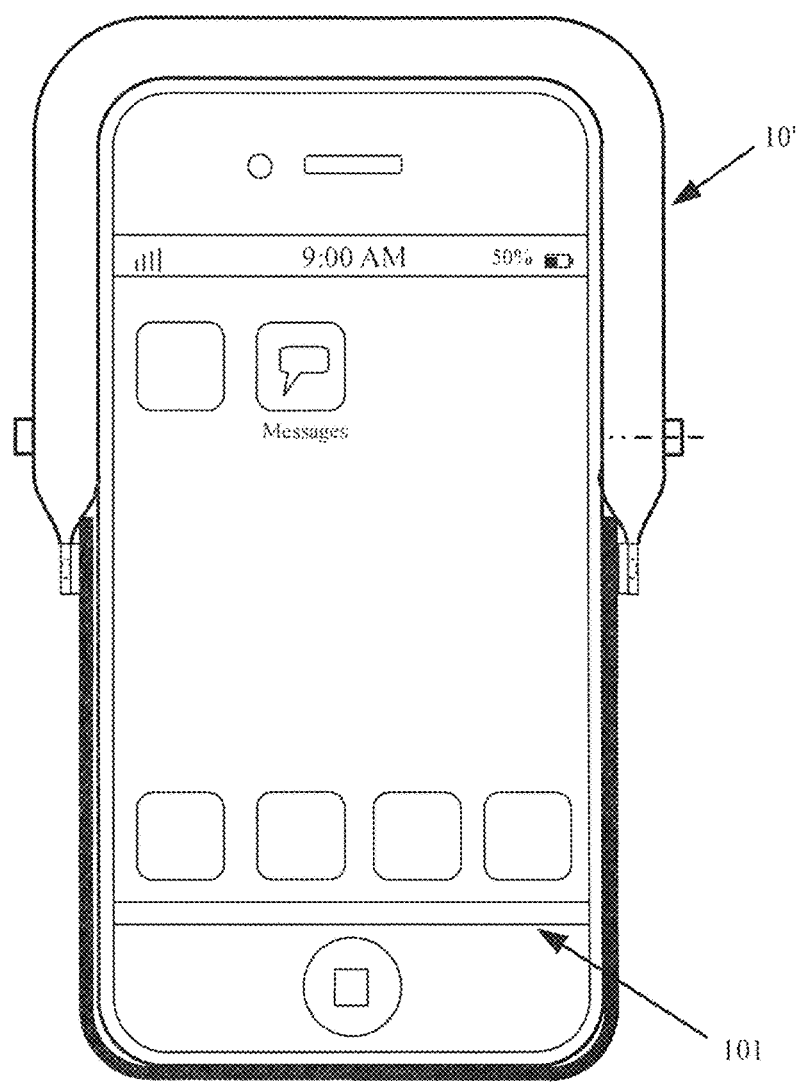
FIG. 8B illustrates the visor assembly with cover, as shown in FIG. 8A, but with the cover shown in the attached position.

FIG. 8A illustrates a visor assembly 10', which is the same as the visor assembly 10 shown in FIG. 1, but which also includes a cover member 50, which may be made of a flexible material such as vinyl. The cover member 50 may have a pair of female snap members 50Si/50Sii secured thereon, which may be configured to releasably attach to the male snap members 20Si/20Sii that are mounted to the attachment member 20. Snap members such as those shown in U.S. Pat. No. 2,042,866 to Simons may be used, or any other suitable snap members may alternatively be used. The cover member 50 is shown in FIG. 8A in the detached position, and is shown in the attached position in FIG. 8B to cover and positively secure the plurality of shroud members. The cover member 50 may be used instead of, or in addition to, the magnets described hereinabove. In addition, narrow, pieces of hook and loop fastening materials 50V/20V (i.e., Velcro®) may each be fixedly attached to the cover 50 and the attachment member 20, respectively, to assist in covering the top portion of the shroud members.

Figure 8C:
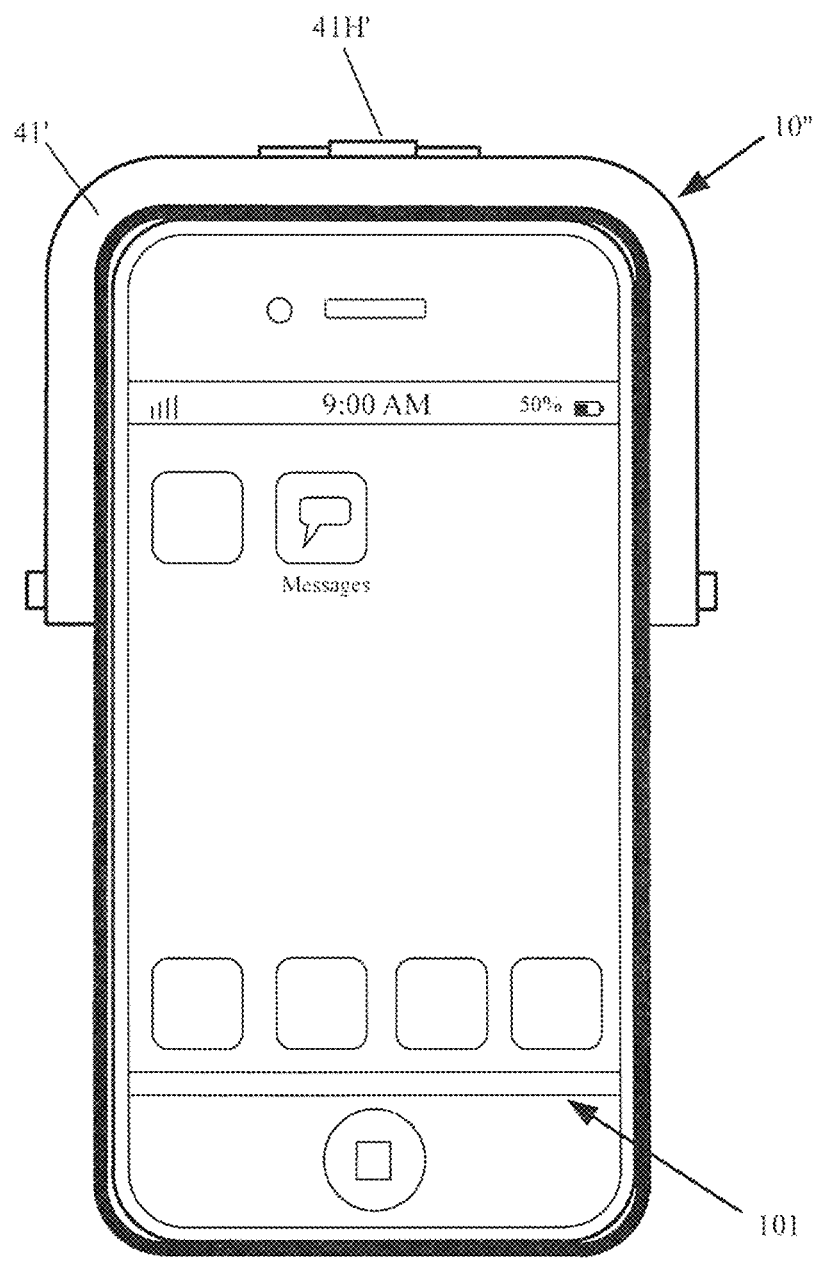
FIG. 8C illustrates the visor assembly of FIG. 1 in which the outer-most shroud member also has a return flange configured to act as a cover for the other shroud member, and configured to secure each of the shroud members using a catch or snaps.

FIG. 8C illustrates a visor assembly 10", which is the same as the visor assembly 10 shown in FIG. 1, but which has the outer-most shroud member 41' formed with a return flange configured to act as a hard cover for the other shroud member. Additionally, the handle 41H' may also have a flexible tab member that is configured to be secured to the back 25 using snaps or a catch, which may be used instead of, or in addition to, the magnets described hereinabove.

Figure 12:
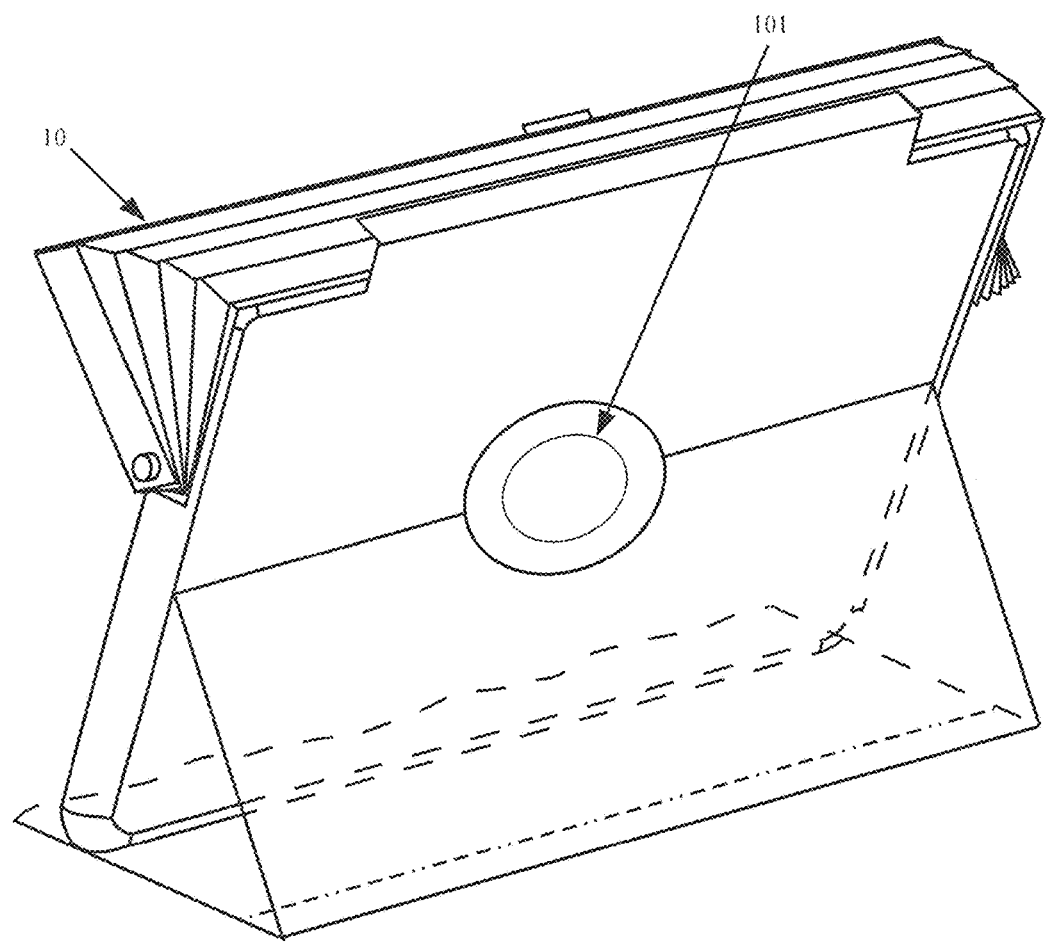
FIG. 12 is the rear perspective view of FIG. 11, but shown with the visor assembly in an extended position, and is furthermore shown with the case portion also incorporating a stand feature therein.
Figure 16:
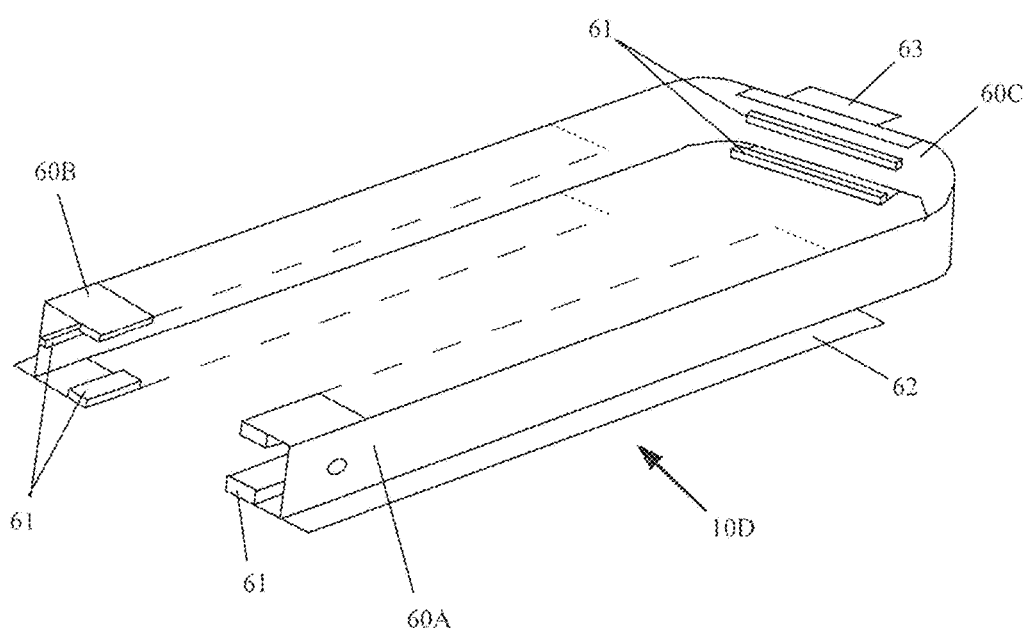
FIG. 16 illustrates another alternate embodiment of the visor assembly of FIG. 1, in which the visor assembly may include mounting features that permit it to be secured onto only a portion of three sides and a portion of the back side of a mobile electronic device.

FIG. 16 illustrates a visor assembly 10D, which may include mounting features that permit it to be secured onto only a portion of three sides and a portion of the front and back side of a mobile electronic device. The visor assembly 10B may include flexible arms 60A and 60B that extend from a top portion 60C. The arms 60A and 60B may each terminate in a C-shaped cross-sectional shape. The visor assembly 10D may contain rubber bumpers 61 at some or all of the contact locations, to provide for cushioned contact with the mobile device. A flange 62 may extend laterally from each of the arms 60A and 60B to serve as a stop for the shroud members, similar to the portion of the back wall 25, as shown in FIG. 12. A handle 63 may be used to begin deployment of the interconnected shroud members.

Figure 17:
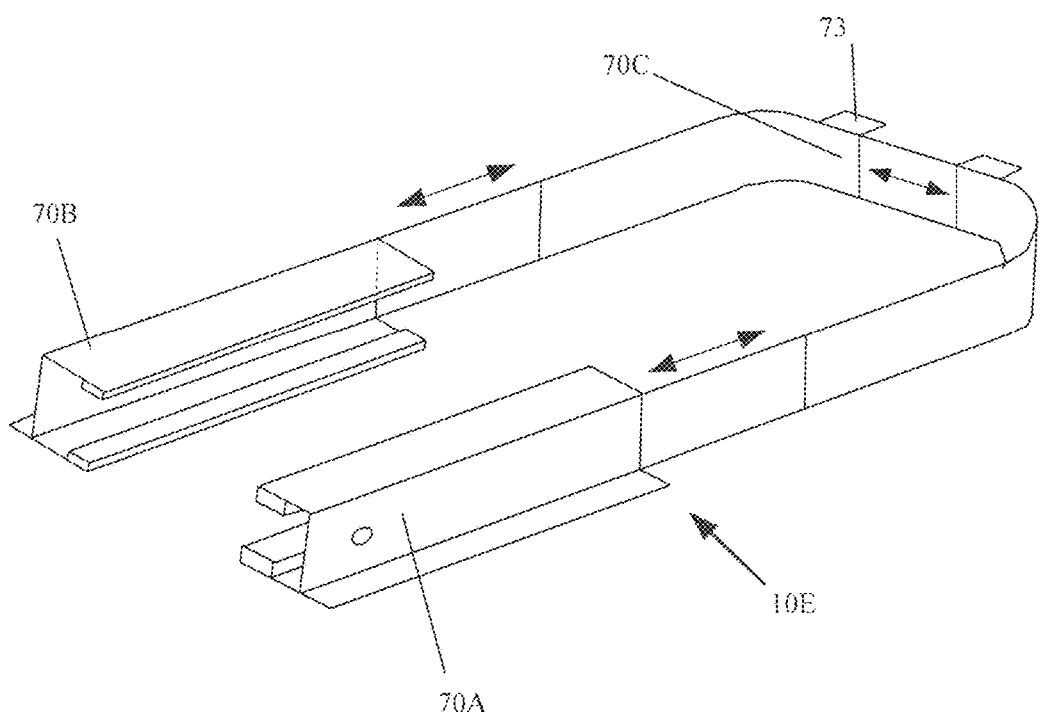
FIG. 17 illustrates another alternate embodiment of the visor assembly of FIG. 1, in which the visor assembly may include mounting features that permit it to be secured onto only a portion of three sides and a portion of the back side of a mobile electronic device, and where the sides and top are adjustable.

FIG. 17 illustrates a visor assembly 10E, which may include mounting features that permit it to be secured onto only a portion of two sides and a portion of the front and back side of a mobile electronic device. Visor assembly 10E may otherwise be constructed similar to visor assembly 10D, except that a portion of its arms 70A and 70B, and its top 70C may each be configured to be extensible, so that one particular visor assembly may be adjusted to fit many different sized mobile devices, particularly for devices in the same class (e.g., the iPhone 4, the iPhone 5, the iPhone 6, the Samsung Galaxy, etc, for a visor assembly adapted for phones; or the iPad, the iPad Mini, etc. for a visor assembly adapted for tablets). The shroud members utilized for visor assembly 10E may similarly be extensible, and may utilize a nested slidable member, or may alternatively utilize an elastic member. A handle 73A/73B may be used to begin deployment of the interconnected shroud members.

Figure 18:
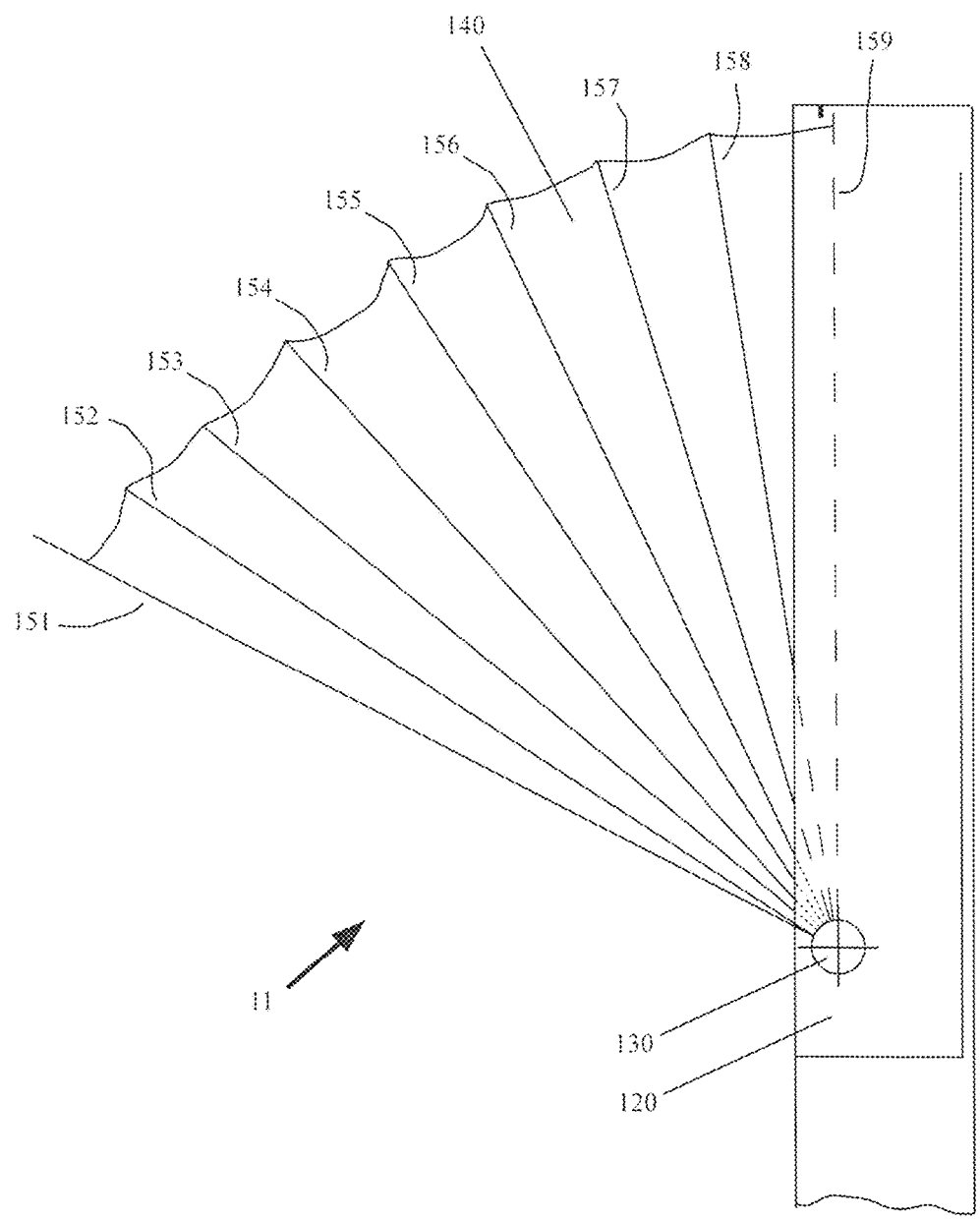
FIG. 18 illustrates another alternate embodiment of the visor assembly of FIG. 1, in which the visor assembly may use a deployable bellows arrangement for shielding the display screen, instead of the plurality of individual cascading visor elements.

FIG. 18 illustrates an alternate embodiment in which visor assembly 11 may be formed with, an attachment member 120 (i.e., any of the hereinabove described arrangements), at least one hinge 130 secured to the attachment member, a flexible shroud material 140, and a plurality of support members (e.g., 151, 152, 153, 154, 155, 156, 157, 158, 159, etc.). Each of the U-shaped support members may have a first end and a second end pivotally coupled to the hinge. At least a central portion of each of the support members may be attached to the flexible shroud material. The flexible shroud material 140 may be gathered between the plurality of support members when in the retracted position, and may alternately expand outwardly, and subsequently contract, similar to a bellows, when desirably positioned by a user.

While illustrative implementations of one or more embodiments of the present invention are provided hereinabove, those skilled in the art and having the benefit of the present disclosure will appreciate that further embodiments may be implemented with various changes within the scope of the present invention. Other modifications, substitutions, omissions and changes may be made in the design, size, materials used or proportions, operating conditions, assembly sequence, or arrangement or positioning of elements and members of the exemplary embodiments without departing from the spirit of this invention.

Accordingly, the breadth and scope of the present disclosure should not be limited by any of the above-described example embodiments, but should be defined only in accordance with the following claims and their equivalents.

What is claimed is:

1. A visor assembly for a mobile electronic device, said visor assembly comprising:
    an attachment member configured to be secured to the mobile electronic device;
    at least one hinge secured to said attachment member; and
    a plurality of cascading shroud members each pivotally coupled to said attachment member using said at least one hinge, and configured to selectively interconnect with an adjacent said shroud member;
    wherein said selective interconnection is configured for rotational movement of a first shroud member of said plurality of shroud members from a retracted position to be independent until reaching a first angular displacement, and to thereafter releasably interconnect to and correspondingly drive a second said shroud member to correspondingly rotate in unison;
    wherein continued rotation of said first shroud member is configured to sequentially drive each succeeding shroud member of said plurality of shroud members to similarly interconnect and be driven into a respective fully extended position at respective angular displacements;
    wherein each of said plurality of shroud members comprises a top shroud portion and two side shroud portions; wherein each of said side shroud portions for each said shroud member is pivotally coupled to said attachment member using said at least one hinge; and wherein said top shroud portion for each of said plurality of shroud members is at a successively different distance from said at least one hinge; and
    wherein said rotation of said first shroud member from said retracted position is limited to 90 degrees.

2. The visor assembly according to claim 1, wherein said sequential deployment of said plurality of shroud members is according to said distance between a respective said top shroud portion and said at least one hinge, beginning with said shroud member having a smallest said distance, and ending with said shroud member having a largest said distance.

3. The visor assembly according to claim 1, wherein said sequential deployment of said plurality of shroud members is according to said distance between a respective said top shroud portion and said at least one hinge, beginning with said shroud member having a largest said distance, and ending with said shroud member having a smallest said distance.

4. The visor assembly according to claim 1, wherein said interconnection between said adjacent said shroud members comprises an outwardly disposed lip on a rear portion of each said shroud member configured to provide selective engagement with an inwardly disposed lip on a front portion of said adjacent shroud member.

5. The visor assembly according to claim 1, wherein said interconnection between said adjacent shroud members comprises a friction fit therebetween, being sufficient to releasably inhibit movement of said plurality of shroud members resulting from only a weight of said shroud members.

6. The visor assembly according to claim 1, wherein said attachment member comprises a protective case configured to engage a back surface and four side surfaces of the mobile electronic device.

7. The visor assembly according to claim 1, wherein said attachment member is configured to engage at least a portion of a back surface, and at least a portion of four side surfaces of the mobile electronic device.

8. The visor assembly according to claim 1, wherein said attachment member is configured to engage at least a portion of a back surface, and to engage only a portion of at least three side surfaces of the mobile electronic device to be clear of buttons on the side surfaces of the mobile electronic device.

9. The visor assembly according to claim 1, wherein said attachment member comprises:
- a first channel-shaped portion configured to engage only a portion of each of a front surface, a back surface, and a first side surface of the mobile electronic device;
- a second channel-shaped portion configured to engage only a portion of each of said front surface, said back surface, and a second side surface of the mobile electronic device;
- a third channel-shaped portion configured to engage only a portion of each of said front surface, said back surface, and a third side surface of the mobile electronic device; and
- wherein said first, second, and third channel-shaped portions of said attachment member are configured to respectively engage only said portions of the first, second, and third side surfaces of the mobile electronic device to be clear of any buttons on the first second and third side surfaces of the mobile electronic device.

10. The visor assembly according to claim 1, wherein each said shroud member is formed to be U-shaped.

11. The visor assembly according to claim 1, wherein said hinge comprises a friction hinge.

12. The visor assembly according to claim 1, further comprising:
- one or more female snap members fixedly secured to said attachment member;
- a cover member fixedly secured to said attachment member, said cover member comprising a flexible material, and one or more male snap members fixedly secured to said flexible material; and
- wherein said one or more male snap members of said cover member are configured to releasably attach to said one or more female snap members for said cover member to overlie and releasably secure each of said plurality of shroud members in said retracted position.

13. The visor assembly according to claim 1, further comprising:
- a cover member, a first portion of said cover member being fixedly secured to said attachment member, said cover member comprising a flexible material; and
- means for releasably securing a second portion of said cover member to said attachment member for overlying and releasably securing each of said plurality of shroud members in said retracted position.

14. The visor assembly according to claim 1, further comprising:
- a handle member configured to extend from said first shroud member;
- a flexible member configured extend from said handle member to a distal end; and
- means for releasably securing said distal end of said flexible member to said attachment member for releasably securing each of said plurality of shroud members in said retracted position.

15. The visor assembly according to claim 1, further comprising respective magnetic portions on each of said plurality of shroud members and on said attachment member, said respective magnetic portions positioned to releasably retain each of said plurality of shroud members in said retracted position.

16. The visor assembly according to claim 1, wherein said first shroud member comprises a return flange configured to cover said second shroud member and each said succeeding shroud member of said plurality of shroud members, when in said retracted position.

17. The visor assembly according to claim 1, wherein said attachment member is configured to mount over a protective case secured to the mobile electronic device.

18. The visor assembly according to claim 9, wherein each of said of said first, second, and third channel-shaped portions of said attachment member comprise rubber bumpers at each or a plurality of contact locations of said attachment member with the mobile electronic device.

19. The visor assembly according to claim 9, wherein each of said first channel-shaped portion and said second channel-shaped portion are configured to be extensible to fit different sizes of the mobile electronic device.

* * * * *